United States Patent
Gianchandani (12)

(10) Patent No.: US 6,460,234 B1
(45) Date of Patent: Oct. 8, 2002

(54) METHOD OF FORMING MICROMACHINED SEALED CAPACITIVE PRESSURE SENSORS

(75) Inventor: Yogesh B. Gianchandani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/570,736

(22) Filed: May 12, 2000

Related U.S. Application Data

(62) Division of application No. 09/375,969, filed on Aug. 17, 1999.
(60) Provisional application No. 60/097,170, filed on Aug. 19, 1998.

(51) Int. Cl.[7] ................................................ H04R 17/00
(52) U.S. Cl. ...................... 29/25.35; 29/592.1; 73/718; 73/724
(58) Field of Search .................... 29/25.35, 25.42, 29/621.1, 595, 592.1; 73/718, 720, 721, 726, 724; 438/456, 700; 216/2, 24, 33, 39

(56) References Cited

U.S. PATENT DOCUMENTS 3,993,939 A   11/1976   Slavin et al.
4,523,474 A   6/1985    Browne et al.

(List continued on next page.)

FOREIGN PATENT DOCUMENTS

DE   41 06 288 A     9/1992
DE   195 13 921 A    10/1996
DE   197 40 244 A    2/1998

OTHER PUBLICATIONS

Jin Ji, et al. "An Ultraminiature CMOS Pressure Sensor for a Multiplexed Cardiovascular Catheter," I.E.E.E. Transactions on Electron Devices, vol. 39, No. 10, Oct., 1992, pp. 2260–2267.

(List continued on next page.)

Primary Examiner—Carl J. Arbes
Assistant Examiner—Minh Trinh
(74) Attorney, Agent, or Firm—Foley & Lardner

(57) ABSTRACT

A micromachined pressure sensor is formed with a minimum number of masking and processing steps. The structure measures changes in pressure by deflection of structures having capacitive plates external to a sealed cavity so that electrical leads can be readily connected to the plates formed on the structures. The pressure sensor includes a substrate, a base secured to the substrate and a diaphragm secured to the base to define a sealed cavity. A skirt may extend outwardly from the base above the substrate to form one of the plates of the capacitor with another plate formed on the base. Changes in ambient pressure deflect the skirt toward or away from the electrode on the substrate, changing the effective capacitance between the electrodes. Electrical connections may be made to the electrode on the skirt and the electrode on the substrate utilizing electrical connectors which are external to the base and thus external to the sealed cavity.

6 Claims, 8 Drawing Sheets

OTHER PUBLICATIONS

Yogesh B. Gianchandani, et al., "A Bulk Silicon Dissolved Wafer Process for Microelectromechanical Devices," Journal of Microelectromechanical Systems, vol. 1, No. 2, Jun. 1992, pp. 77–85.

J. Von Arx, et al., "Hermeticity Testing of Glass–Silicon Packages with On–Chip Feedthroughs," Proc. Transducers '95–Eurosensors IX, Stockholm, Sweden, Jun. 25–29, 1995, pp. 244–247.

Abhijeet V. Chavan, et al., "A Batch–Processed Vacuum–Sealed Capacitive Pressure Sensor," Proc. Transducers '97, Chicago, Illinois, Jun. 16–19, 1997, pp. 1449–1452.

Yuelin Wang, et al., "A Novel Electrostatic Servo Capacitive Vacuum Sensor," Proc. Transducers '97, Chicago, Illinois, Jun. 16–19, 1997, pp. 1457–1460.

Abhijeet V. Chavan, et al., "A Multi–Lead Vacuum–Sealed Capacitive Pressure Sensor," Proc. Solid–State Sensor and Actuator Workshop, Hilton Head Island, South Carolina, Jun. 8–11, 1998, pp. 212–215.

Steve T. Cho, et al., "A Self–Testing Ultrasensitive Silicon Microflow Sensor," Proc. Sensor Exposition, Chicago, Illinois, 1991.

W.H. Ko, et al., "Touch Mode Capacitive Pressure Sensors for Industrial Applications," Proc. Solid–State Sensor and Actuator Workshop, Hilton Head, South Carolina, Jun. 2–6, 1996, pp. 244–248.

J.S. Park and Y.B. Gianchandani, "A Low Cost Batch–Sealed Capacitor Pressure Sensor," IEEE Int. Workshop on Microelectromechanical Systems (MEMS '99), Jan., 1999, Orlando, Florida.

* cited by examiner

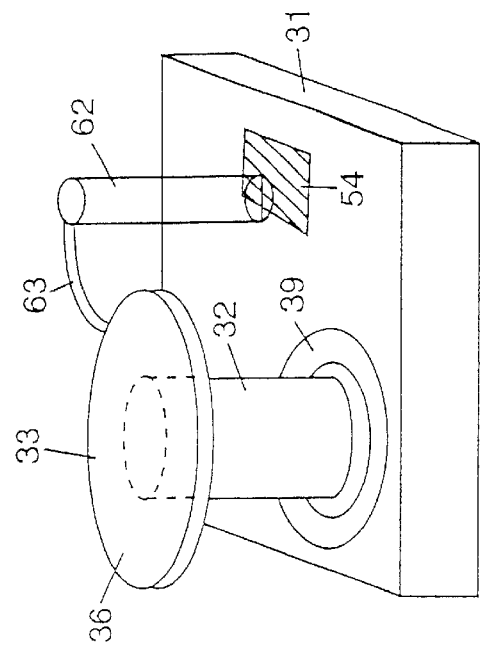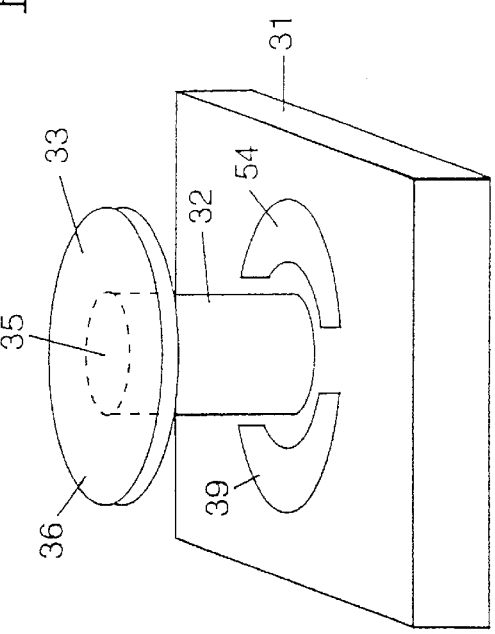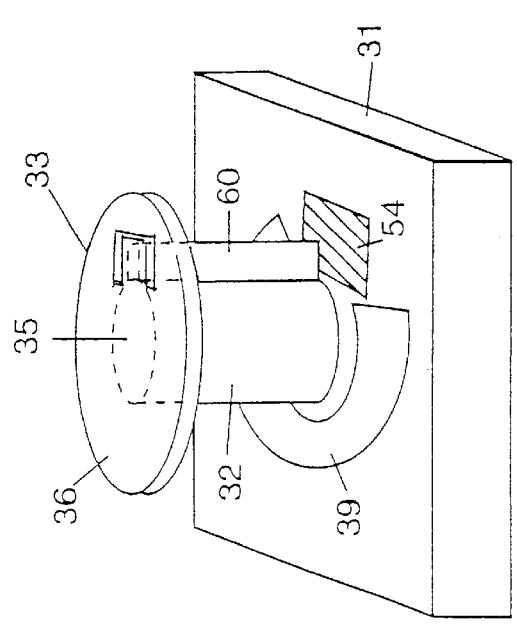

METHOD OF FORMING MICROMACHINED SEALED CAPACITIVE PRESSURE SENSORS

This application is a divisional of application Serial No. 09/375,969, filed Aug. 17, 1999, and claims the benefit of provisional patent application No. 60/097,170, filed Aug. 19, 1998, the disclosure of which is incorporated by reference.

FIELD OF THE INVENTION

This invention pertains generally to the field of pressure sensors and particularly to micromachined pressure sensors.

BACKGROUND OF THE INVENTION

Conventional pressure sensors have typically been large, discrete devices formed using a large diaphragm, usually of metal, as the pressure barrier. To minimize the fabrication cost and the size of components, and to reduce the size of the pressure sensor structure to a size comparable to that of integrated circuits to which the sensors are interfaced, significant efforts have been made to produce micromachined pressure sensors on silicon substrates. For example, pressure sensors have been formed by selective etching of a silicon substrate until the etch is terminated by a highly doped layer to form a thin membrane, and by thereafter bonding another member over the membrane to define a cavity, and by forming polysilicon membranes on the surface of a single crystal silicon substrate.

The diaphragm of a pressure sensor deflects in response to the differential pressure across it in a manner which is related to the differential pressure. The deflection of the diaphragm can be measured in various ways, including the use of piezoresistive elements formed on the diaphragm which change in resistance as a function of the strain in the diaphragm, and by capacitive sensing in which a surface of the diaphragm forms one of the plates of a capacitor and the other plate is formed on the substrate beneath the diaphragm. While capacitive sensing in this manner has advantages over piezoresistive sensing and is commonly used, both for conventional large, discrete pressure sensors and for micromachined sensors, microfabrication of such devices is typically complicated. In particular, where the bottom plate or electrode of the capacitor is sealed in a cavity under the diaphragm, transferring a signal from the plate to the exterior of the cavity, where the signal can be transmitted to interface electronics, presents a formidable manufacturing challenge, In general, several additional microfabrication steps are required to successfully extend a lead from the sealed cavity to the exterior, with the overall process becoming quite complicated, requiring as many as ten masking steps. See, e.g., A. V. Chavan and K. D. Wise, "A Batch-Processed Vacuum-Sealed Capacitive Pressure Sensor," Proc. Int'l. Conf. On Solid-State Sensors and Actuators, Chicago, Ill., June 1997, pp. 1449–1452; A. V. Chavan and K. D. Wise, "A Multi-Lead Vacuum-Sealed Capacitive Pressure Sensor," Proc. Solid-State Sensor and Actuator Workshop, Hilton Head Island, S.C., June 1998, pp. 212–215. Some approaches accomplish hermetic sealing of the sensor cavity with techniques that are not generally compatible with lithography-based batch-fabrication techniques. Y. Wang and M. Esashi, "A Novel Electrostatic Servo Capacitive Vacuum Sensor," Proc. Int'l. Conf. On Solid-State Sensors and Actuators, Chicago, Ill., June 1997, pp. 1457–1460.

SUMMARY OF THE INVENTION

A micromachined pressure sensor in accordance with the invention can be formed utilizing a minimum number of masking and processing steps while avoiding the need to extend an electrical lead through a wall of the sealed cavity of the pressure sensor. Changes in pressure result in deflection of structures having capacitive plates formed thereon which are external to the sealed cavity, so that electrical leads can be readily connected to the plates formed on such structures. The capacitive pressure sensors can be formed in a manner which is compatible with conventional lithographic processing of silicon substrates as carried out in standard integrated circuit production, allowing such pressure sensors to be interfaced with integrated circuits. The deformable structures of the sensor may be formed of conventional materials used in microelectronic processing, such as crystalline silicon, in an efficient and economical production process.

A pressure sensor in accordance with the invention includes a substrate, a base secured to the substrate and a diaphragm secured to the base to define a sealed cavity between the base, substrate and diaphragm. A first electrode is formed on at least one of the diaphragm or base to deflect therewith and a second electrode is formed adjacent thereto. An electrode formed, for example, on the substrate may comprise the second electrode and form one of the plates of a capacitor. A skirt extending outwardly from the base above the substrate may form the first electrode as the other plate of the capacitor, with at least one of the diaphragm or the base deforming and deflecting with changes in ambient pressure to deflect the skirt toward or away from the other electrode to change the effective capacitance therebetween in a manner which is related to the changes in pressure.

The base may be formed as a hollow cylinder and the diaphragm and skirt may be formed integrally together as a flat, circular plate which is secured to the top of the base (e.g., by being integrally formed therewith) to provide a sealed cavity under the diaphragm and with the skirt extending outwardly from the periphery of the base over an electrode formed on the substrate. The skirt itself may form one of the plates of the variable capacitor by, for example, being formed of heavily doped and electrically conductive silicon, with the other electrode plate of the capacitor deposited as a metal film on the substrate under the skirt. Alternatively, two separate electrodes forming the plates of the capacitor may be formed underneath the skirt and being coupled to each other through the skirt so that deflections of the skirt change the relative capacitance between the two separated plates. The skirt may also be formed to extend from the base at positions intermediate the top and bottom of the base rather than extending from the diaphragm, and may be formed to have various modified cantilever structures which position a section of the skirt more closely adjacent to the underlying capacitor plate on the substrate while maintaining the full height of the base. The base may also be formed with alternative structures in multiple parts with the skirt extending between the deformable base structures, and the skirt itself may be integrally formed as a wall of the base with the skirt deflecting in response to changes in pressure within the sealed cavity to change the relative position of the sidewall of the base, functioning as the skirt, with respect to an adjacent electrode plate. Because the skirt may be formed to deflect away from the adjacent electrode with increasing ambient pressure, the pressure sensors of the present invention are well suited to feedback control in which a voltage is applied across the plates of the capacitor at an appropriate level to deflect the skirt back toward a reference position.

Further objects, features and advantages of the invention will be apparent from the following detailed description when taken in conjunction with the accompanying drawings.

BRIEF DESCRIPTION OF THE DRAWINGS

In the drawings:

FIG. 14 is a simplified perspective view illustrating a structure for an electrical connection to the deformable silicon diaphragm of the pressure sensor.

FIG. 15 is a perspective view of an alternative structure for an electrical connection to the deformable diaphragm of the pressure sensor.

FIG. 16 is a perspective view of an alternative arrangement for capacitive coupling to the deformable diaphragm.

DETAILED DESCRIPTION OF THE INVENTION

Figure 1:
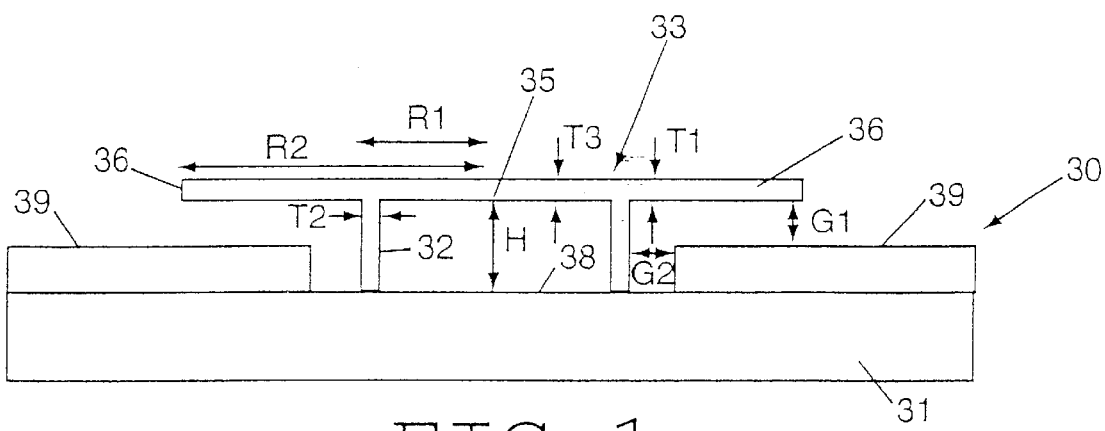
FIG. 1 is a simplified cross-sectional view of a pressure sensor in accordance with the invention.

With reference to the drawings, a simplified cross-sectional view of a microfabricated pressure sensor in accordance with the invention is shown in cross-section generally at 30 in FIG. 1. The pressure sensor 30 is formed on a structural substrate 31, e.g., glass, to which is attached a deformable sensor structure comprising a base section 32 (which may be but is not necessarily cylindrical) and a flat deformable diaphragm 33. The diaphragm 33 has a central section 35 and an outwardly extending peripheral skirt section 36. The central portion 35 of the diaphragm together with the cylindrical walls of the base 32 and a surface 38 of the substrate 31 define a sealed cavity, which may be evacuated or set at a reference pressure. An electrode ring 39, e.g., of a conductive metal such as platinum, gold, aluminum, etc., is formed on the substrate 31 under the extending skirt 36. The electrode 39 forms one of the plates of a capacitor, a second or stationary electrode, with the other plate defining a first or deflecting electrode formed by the extending skirt 36 spaced above and adjacent to the electrode 39. For example, the skirt 36 may be coated with an electrically conductive material or the skirt itself may be formed of a material, such as single crystal silicon, which is doped to be electrically conductive.

Figure 2:
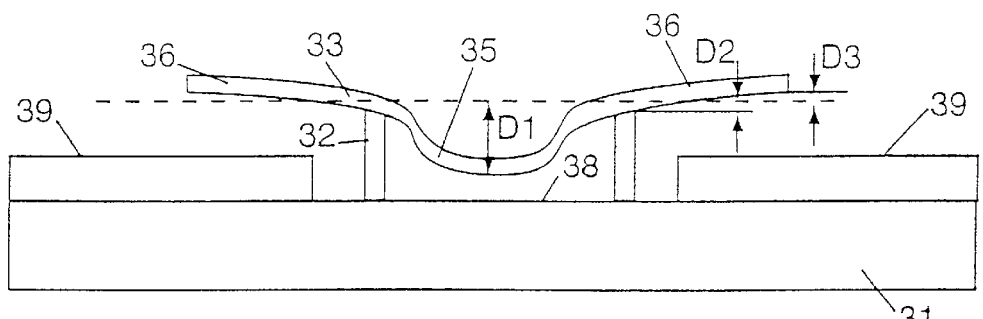
FIG. 2 is a cross-sectional view of the pressure sensor of FIG. 1 shown partially deflected.
Figure 3:
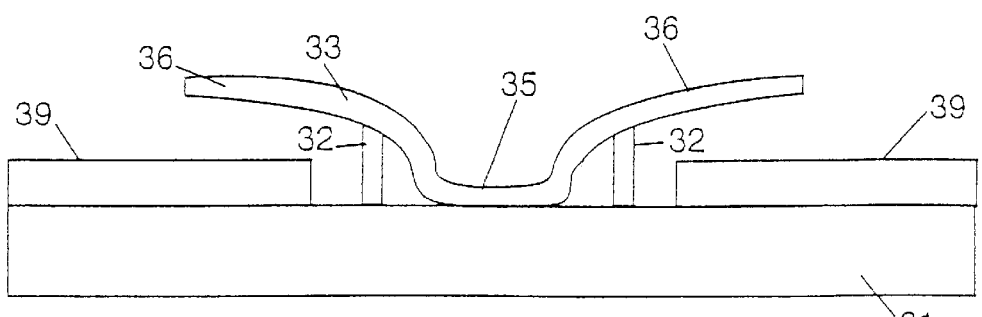
FIG. 3 is a cross-sectional view of the pressure sensor of FIG. 1 shown with the diaphragm deflected to touch-down.

As illustrated in FIG. 2, an increase in ambient pressure causes a downward deflection of the center portion 35 of the diaphragm 33, bringing the center of the diaphragm closer to the substrate surface 38. This deflection, in turn, raises the skirt 36 away from the plates 39. If the pressure increases enough, the central portion 35 of the diaphragm 33 will touch down to the surface 38 as illustrated in FIG. 3. However, because of the manner of the construction of the sensor, further increases in pressure continue to result in changes in the deflection of the skirt or flap sections 36 away from the plate 39, allowing the pressure sensor to continue to detect pressure changes even at such "over-pressure" conditions.

It is a particular advantage of the pressure sensor structure of the present invention that the skirt, with its associated electrode, can deflect away from the adjacent electrode (e.g., as formed on the substrate) with increases in pressure. In conventional capacitive pressure sensor designs, the diaphragm with its associated electrode is drawn closer to the underlying electrode on the substrate as the ambient pressure increases. Consequently, it is generally not possible to control the position of the diaphragm by applying a voltage between the electrodes on the substrate and diaphragm, since such a voltage would tend to draw the diaphragm toward the substrate. In contrast, applying a voltage between the skirt 36 and the underlying electrode 39 tends to draw the skirt toward the substrate, which can thus oppose the upward deflection of the skirt as ambient pressure increases. This feature allows feedback control of the position of the skirt toward a reference position, and the level of the voltage applied between the plates to maintain the reference position may be used as a signal indicative of the ambient pressure.

To illustrate the properties of the pressure transducer in accordance with the invention, the following dimensions and displacements, which are illustrated with respect to FIGS. 1 and 2, may be defined:

T1=Thickness of skirt or flap 36;
T2=Thickness of sidewalls;
T3=Thickness of central cap 35 on sealed cavity;
R1=Radius of sealed cavity;
R2=Radius of diaphragm;
H=Height of sealed cavity;
G1=Nominal gap between skirt 36 and electrode 39;
G2=Clearance between electrode 39 and sidewalls of base 32;
D1=Deflection at center of diaphragm (downward is negative, upward positive);

D2=Deflection at support where diaphragm 33 is attached to base 32; and

D3=Deflection at peripheral rim of skirt 36.

The following examples illustrate the performance of a pressure sensor as in FIG. 1. In each example, the parameters T1=T2=T3=5 μm; H=30 μm; G1=5 μm; G2=0; Young's modulus=160 GPa; residual stress=20 MPa tensile; and Poisson's ratio=0.2.

Figure 4:
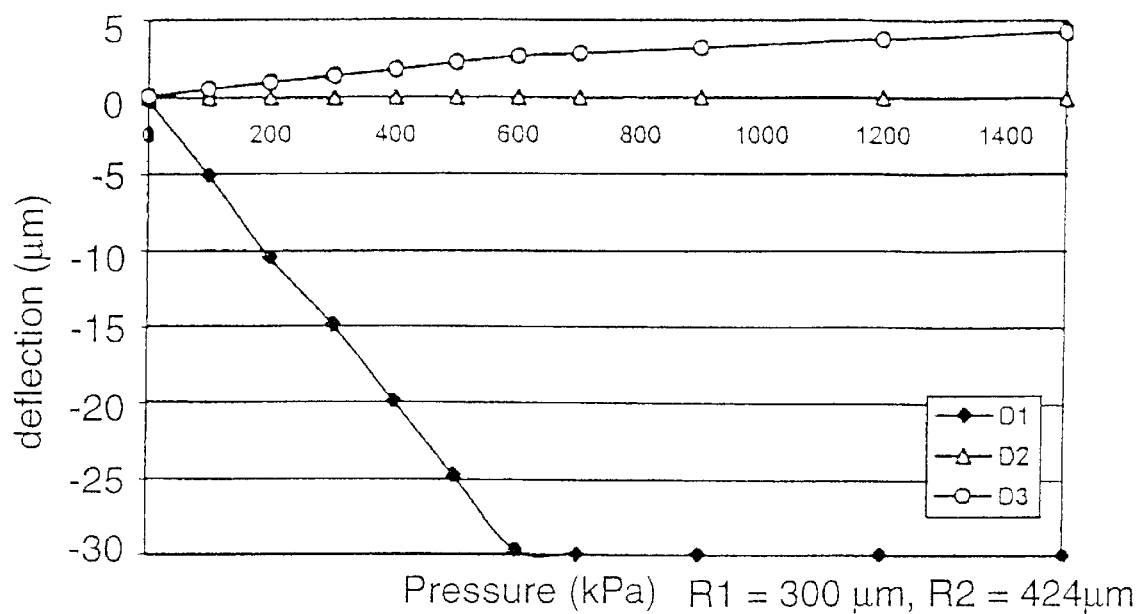
FIG. 4 is a graph illustrating computed deflection versus pressure for an exemplary pressure sensor as in FIG. 1.
Figure 5:
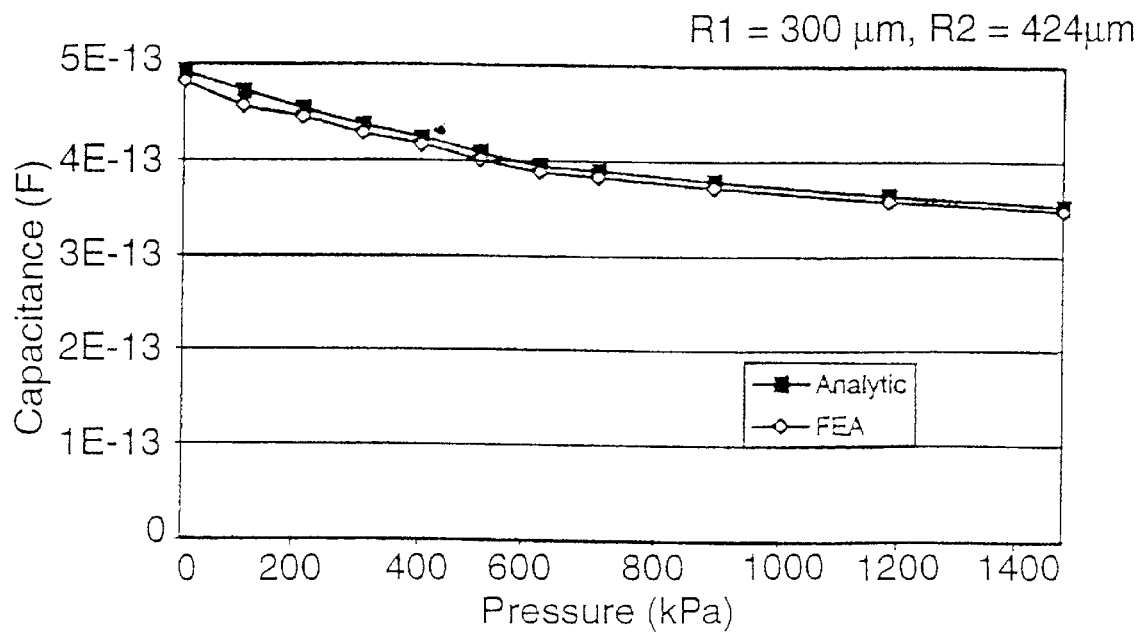
FIG. 5 is a graph illustrating pressure versus capacitance for the exemplary pressure sensor in accordance with FIG. 4.
Figure 6:
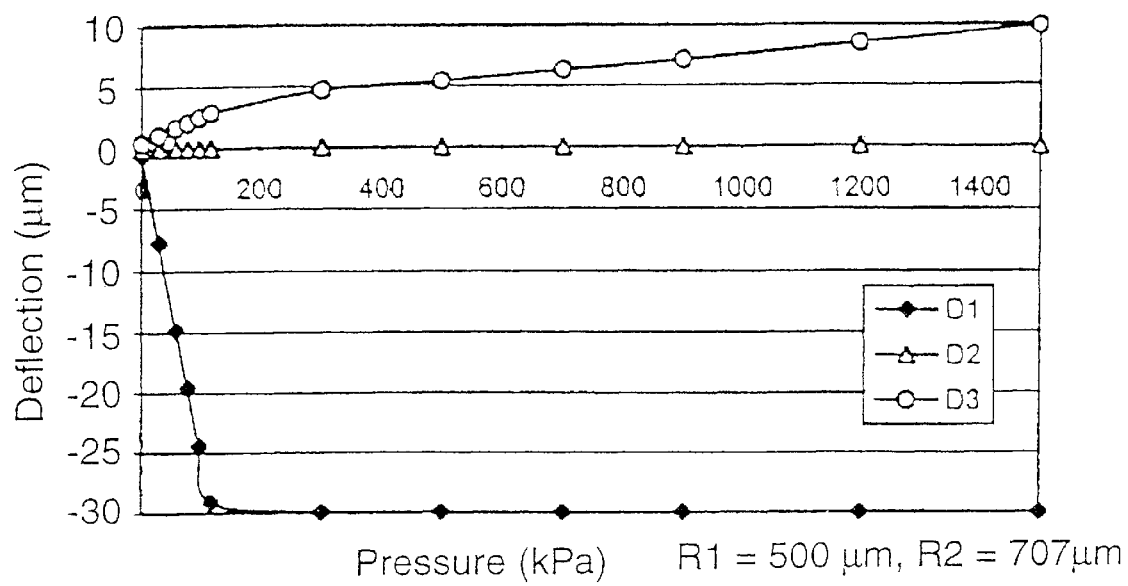
FIG. 6 is a graph of computed deflection versus pressure for another exemplary pressure sensor of the invention.
Figure 7:
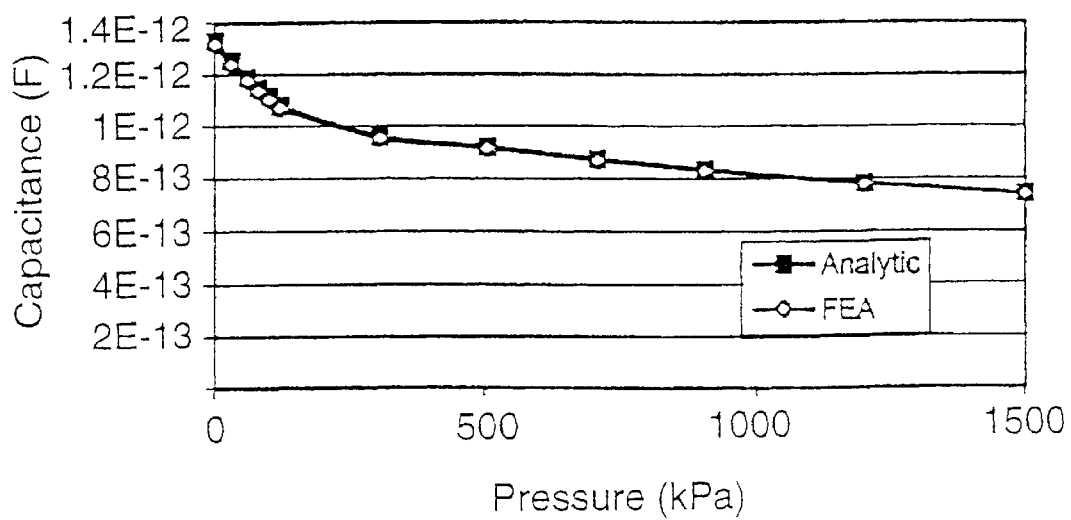
FIG. 7 is a graph of computed capacitance versus pressure for a pressure sensor as in FIG. 6.
Figure 8:
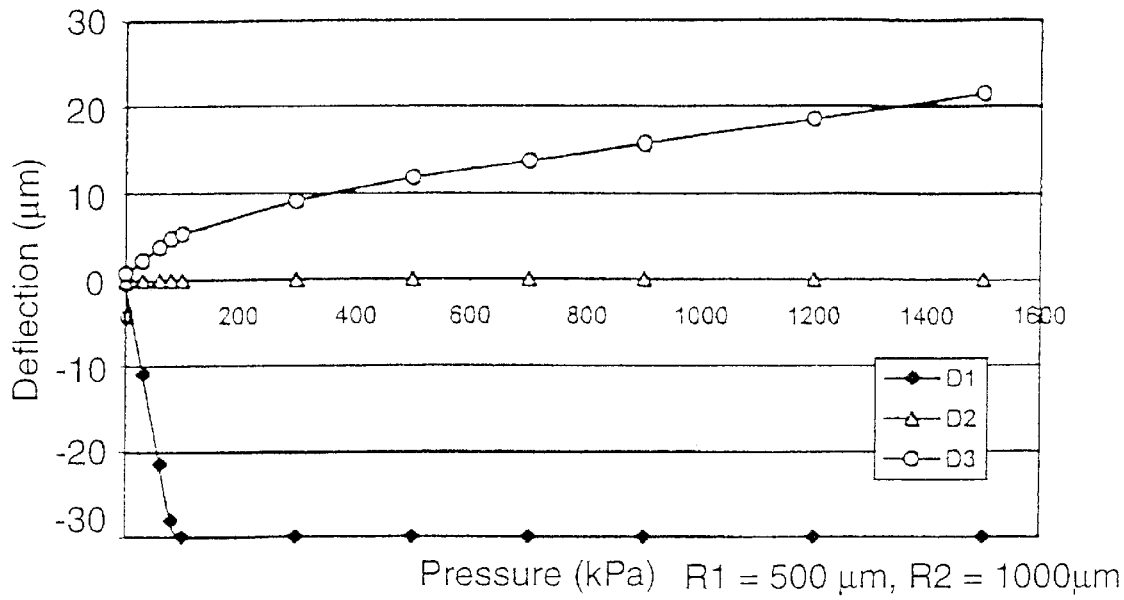
FIG. 8 is a graph of computed deflection versus pressure for a further exemplary pressure sensor in accordance with the invention.
Figure 9:
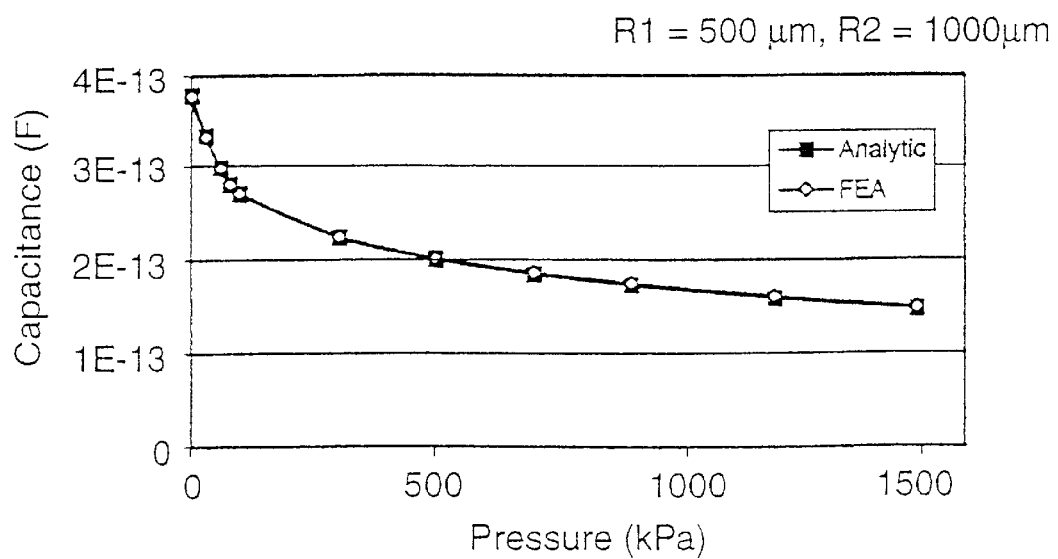
FIG. 9 is a graph of computed capacitance versus pressure for the pressure sensor as in FIG. 8.

For the first example, in which R1=300 μm and R2=424 μm, FIG. 4 illustrates the calculated deflection versus pressure and FIG. 5 illustrates calculated capacitance versus pressure. As shown therein, the deflection of the center of the diaphragm terminates as the diaphragm reaches bottom but the displacement of the extending skirt, and thereby the relative capacitance between the plates of the sensor capacitor, continues to change beyond the point of touch down. FIG. 6 illustrates computed deflection versus pressure and FIG. 7 illustrates computed capacitance versus pressure for a second pressure sensor in which R1=500 μm and R2=707 μm. FIG. 8 illustrates computed deflection versus pressure and FIG. 9 illustrates computer capacitance versus pressure for a third example in which R1=500 μm and R2=1000 μm. Again, for each of these examples, it is seen that the capacitance changes with applied pressure in a substantially linear manner up to touch-down, but also continues to change in response to additional pressure in a repeatable (if nonlinear) manner after touch-down of the diaphragm to the underlying substrate surface.

Figure 10:
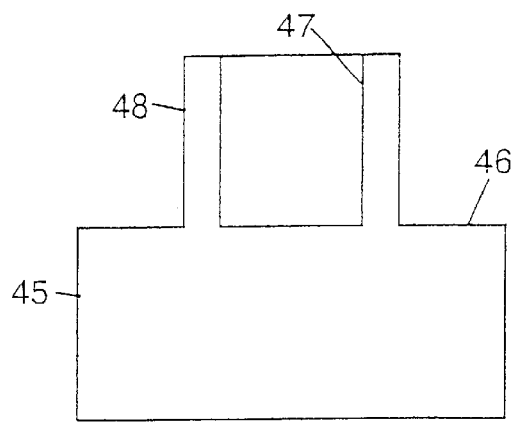
FIG. 10 is a simplified cross-sectional view illustrating a first step in the fabrication of a pressure sensor as shown in FIG. 1.
Figure 11:
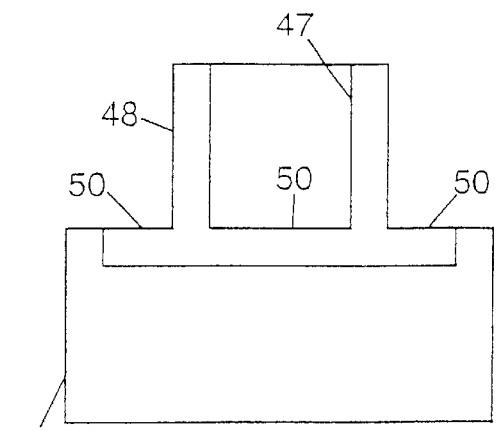
FIG. 11 is a simplified cross-sectional view showing a diffusion step in the formation of a pressure sensor as in FIG. 1.
Figure 12:
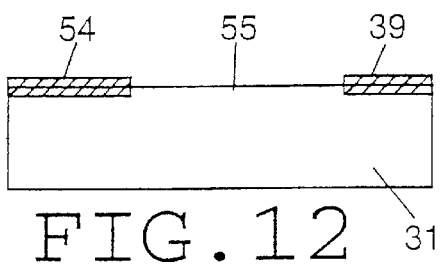
FIG. 12 is an illustrative cross-sectional view of a glass substrate to be used in the formation of pressure sensor as in FIG. 1.
Figure 13:
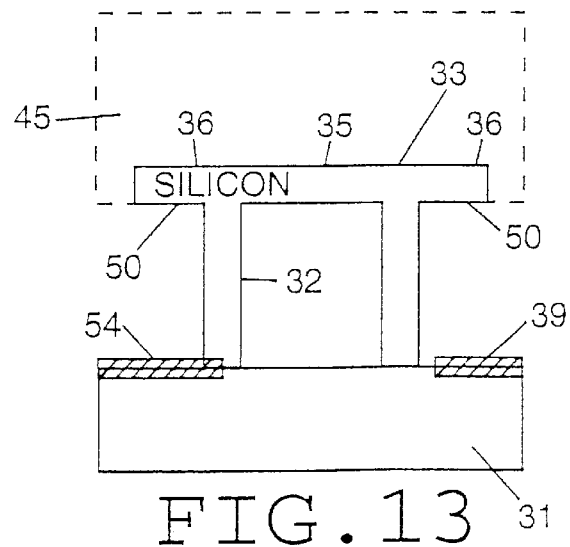
FIG. 13 is a simplified cross-sectional view illustrating the assembly of the pressure sensor as in FIG. 1.

The sealed cavity pressure sensor of the invention can be produced utilizing standard semiconductor processing techniques with fewer masking and etching steps than are required for other sealed cavity micromachined capacitive pressure transducers. Suitable processing techniques are described in the article by Yogesh B. Gianchandani and Khalil Najafi, "A Bulk Silicon Dissolved Wafer Process for Micromechanical Devices," J. of Micromechanical Systems, Vol. 1, No. 2, June, 1992, pp. 77–85. A processing sequence for producing the pressure transducer 30 of FIGS. 1–3 is illustrated with respect to the views of FIGS. 10–13, in which only three masking steps are required. The first step, as illustrated in FIG. 10, involves the lithographic masking of a single crystal semiconductor (e.g., silicon) substrate 45 and etching using reactive ion etching, or any other suitable method, to etch away the substrate in areas 46 adjacent to the structure and to leave a central cavity 47 which is surrounded by a relatively thin walled cylindrical structure 48 which will constitute the base of the pressure sensor. The next step, as illustrated in FIG. 11, is the masking of the regions of the substrate 45 to define areas 50 on either side of the cylinder 48 and a boron diffusion step in which boron diffuses entirely through the upright cylinder 48 and to a selected depth into the substrate 45 in the regions 50 which surround the cylindrical structure 48. It is understood that the views of FIGS. 10 and 11 are illustrative cross-sectional views, and that the regions 50 constitute a region (which may be circular or other configuration) surrounding the cylindrical structure 48. In a next step, as illustrated in FIG. 12, a structural substrate such as a glass wafer substrate 31 has metal electrodes 54 and 39 inlaid thereon. The electrodes 54 and 39 are separated by an open surface area 55 of the glass structural substrate 31 which electrically insulates the electrodes 39 and 54 from each other. The structure shown in FIG. 13 is immersed in an enchant which etches away the undoped portions of the silicon substrate 45 to leave the diaphragm 33 defined by the heavily boron doped portion of the substrate. The regions 50 are free to now define the extending skirt sections 36 of the diaphragm and the central portion 35. The freed part is anodically bonded to the structural substrate 31, as illustrated in FIG. 13, preferably before or alternatively after etching away of the semiconductor substrate 45, with the electrode 54 in contact with and extending partially, but not entirely, underneath the cylindrical wall 32 of the base. The electrode 54 is thus in electrical contact with the base 32, and thus with the diaphragm 33 because the base and diaphragm are heavily doped and therefore are good electrical conductors. The electrode 39 forms a plate of the capacitor with the extending skirt portions 36 of the diaphragm. Although the semiconductor structure is shown in cross-section only in FIG. 13, it is understood that the electrode 39 would be formed in a pattern surrounding the base 32 at the electrode 54 (where the electrode 39 terminates so that it remains spaced from and electrically isolated from the electrode 54).

Other ways for making contact to the diaphragm or otherwise providing coupling without requiring connections through the walls of the sealed cavity are illustrated in FIGS. 14–16. As shown in FIG. 14, connection may be made to the diaphragm 33 by a protruding post of heavily doped silicon 60 which extends up from contact to an electrode 54 to contact with the diaphragm 33. A notch may be formed in the skirt 36 around the post 60 to allow the skirt to flex freely. In the structure shown in FIG. 15, a free-standing post of heavily doped silicon 62 extends upwardly from contact to an electrode 54, with silicon wires 63 extending from the post 62 to the edge of the diaphragm 33. In FIG. 16, a first half electrode 39 and a second half electrode 54 are formed on the substrate 31, with the base 32 and diaphragm 33 being electrically isolated from both of the electrodes 39 and 54. The electrodes 39 and 54 are capacitively coupled together through the diaphragm 33, which thus forms an intermediate conductive sheet in the capacitor defined between these two electrodes.

Figure 17:
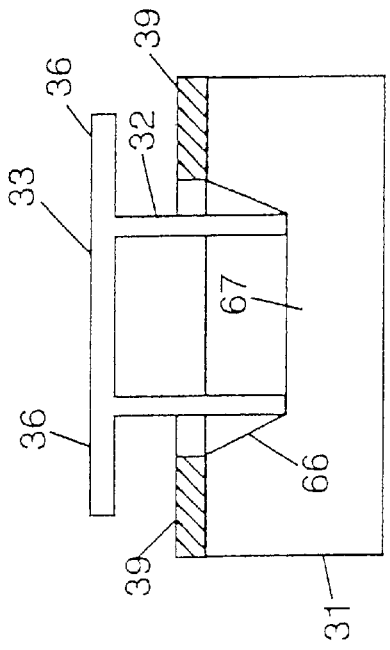
FIG. 17 is a simplified cross-sectional view illustrating an alternative structure with the diaphragm of the pressure sensor mounted over a depression in the substrate.
Figure 18:
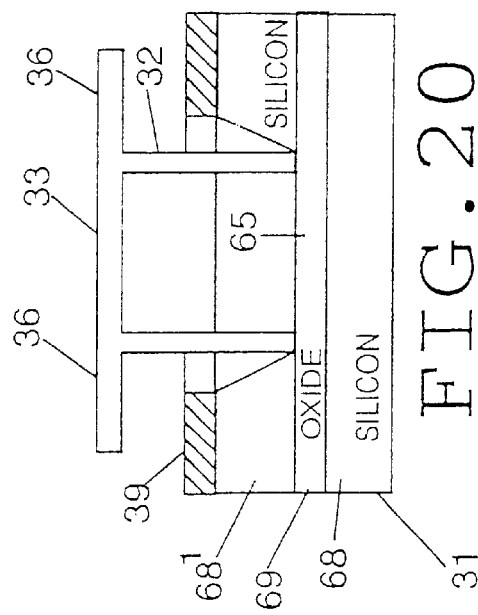
FIG. 18 is an alternative structure with the pressure sensor mounted within a depression in the substrate.
Figure 19:
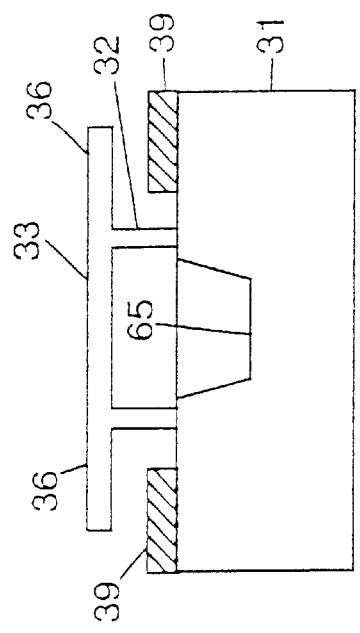
FIG. 19 is a simplified cross-sectional view of a pressure sensor with a thickly plated external electrode.
Figure 20:
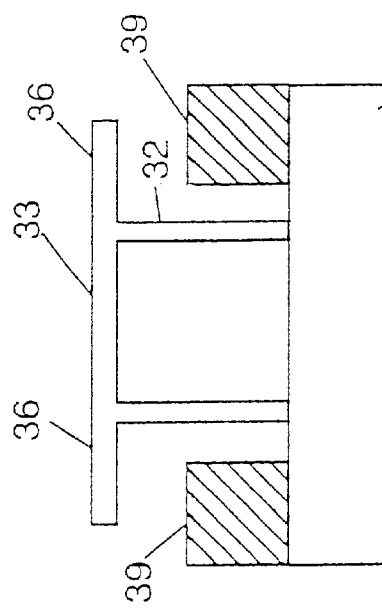
FIG. 20 is a simplified cross-sectional view of a pressure sensor formed in a depression on a silicon-on-insulator substrate.

One way to increase the effective capacitance, and thus the sensitivity, of the pressure sensor is to reduce the spacing between the deformable diaphragm and the electrode 39. Structures in accordance with the invention which may be utilized to reduce electrode spacing while maintaining the relative dimensions of the structure, particularly the sealed cavity, are illustrated in FIGS. 17–20. With reference to FIG. 17, the substrate 31 is formed with a well or depression 65 therein which is encircled by the base 32 bonded to the surface of the substrate 31. The height of the cylindrical walls 32 can thus be made shorter while maintaining the same maximum downward deflection of the diaphragm 35. In FIG. 18, a large depression 66 is formed in the substrate 31 which has a large flat bottom 67 that is wide enough to receive the entire base 32, and the base is bonded to the bottom surface 67 of the depression. In this manner, the total height of the cylindrical base 32 may be maintained while nonetheless reducing the spacing between the electrode 39 and the outwardly extending skirt 36. As shown in FIG. 19, the spacing between the electrode 39 and the extending skirt 36 may also be reduced by forming a very thick electrode 39 (e.g., by electroplating onto the substrate) to a desired height which results in the reduced spacing between the electrode and the skirt. As shown in FIG. 20, other substrates 31 may be used, including a silicon-on-insulator substrate which includes a base layer of crystalline silicon 68, an insulating layer of silicon dioxide 69, and a surface layer 68' of silicon grown on the oxide layer 69. A depression 65 is formed by etching into the surface silicon layer 68' until it reaches the surface 65 of the oxide layer 69. The base 32 is then bonded on to the exposed surface 65 of the oxide, with a resulting reduced spacing between the electrode 39 and the extending skirt 36 of the diaphragm.

Figure 21:
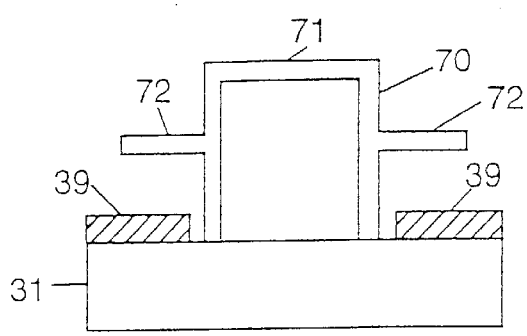
FIGS. 21–28 are simplified cross-sectional views of further configurations of the pressure sensor in accordance with the invention.
Figure 22:
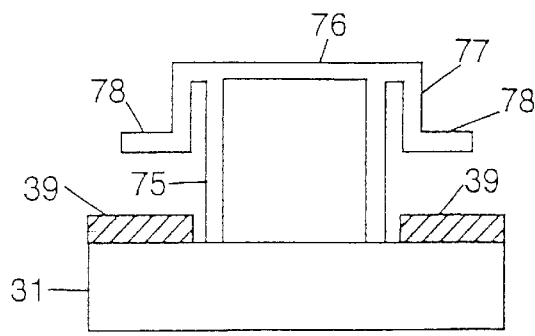

Various other structures may be formed in accordance with the invention in addition to the cylindrical base topped by a flat diaphragm structure of FIGS. 1–3. Examples of such structures are illustrated in FIGS. 21–28. In the structure of FIG. 21, a cylindrical base 70 is closed at its top by a diaphragm panel 71 and has skirts 72 forming the first electrode extending outwardly from the cylindrical base 70 at an intermediate position more closely spaced to the second electrode 39 on the substrate. In the structure of FIG. 22, a cylindrical base 75 is sealed at its top by a diaphragm 76 that has a downwardly extending portion 77 and an outwardly extending portion 78 which defines a skirt forming a first electrode spaced closely adjacent to the second electrode 39. In both of the structures of FIG. 21 and FIG. 22, flexing of the diaphragm and the cylindrical sidewalls with changes in pressure will cause deflection of the extending skirts 72 and 78 to result in changes in capacitance.

Figure 23:
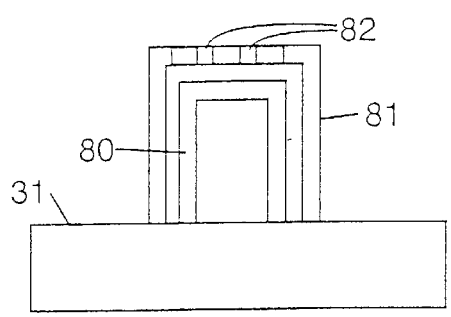
Figure 24:
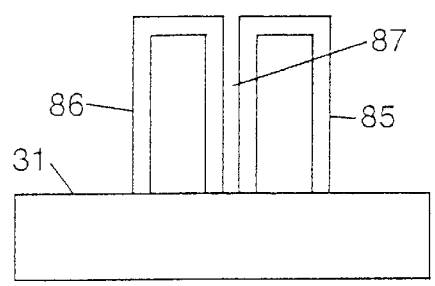

In the structure of FIG. 23, a sealed interior cylindrical can structure 80, formed of a base with a diaphragm panel sealed thereto similar to the structure of FIG. 21, is surrounded by a closely spaced outer cylindrical structure 81 which has openings 82 in the top wall thereof. As the walls of the inner cylindrical can 80 that define the first electrode extend outwardly or draw inwardly with changes in ambient pressure, the capacitance between the closely adjacent surfaces of the inner cylinder 80 and the outer cylinder 81 (forming the second electrode) changes. In the structure of FIG. 24, two sealed cavity structures 85 and 86 formed of a base sealed by a diaphragm panel are mounted closely adjacent to each other on the surface of the substrate 31 separated by a small spacing distance 87. As the walls of the structures 85 and 86, which form the first and second electrodes, expand or contract with pressure, the closely adjacent walls in these two structures will deflect toward or away from each other, changing the capacitance between the structures.

Figure 25:
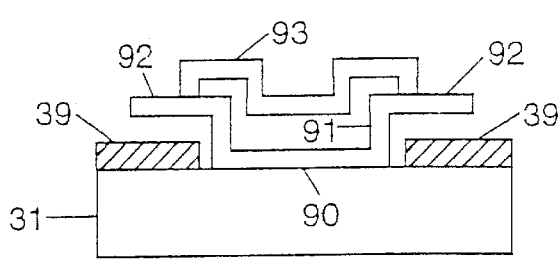

In the structure of FIG. 25, a base 90 is secured to the substrate 31 and has upwardly extending cylindrical sidewalls 91 and outwardly extending skirt sections 92 forming a first electrode which are spaced above the second electrode 39. A sealed cavity in this case is formed by securing a further diaphragm structure 93 to the top of the skirt sections 92. As the diaphragm 93 is, for example, pushed downwardly by increasing pressure, the skirts 92 will be drawn upwardly away from the electrode 39, thereby changing the capacitance between these structures.

The structure of FIG. 25 is adapted for production by a surface micromachining process using typical micromachined materials, e.g., polysilicon.

Figure 26:
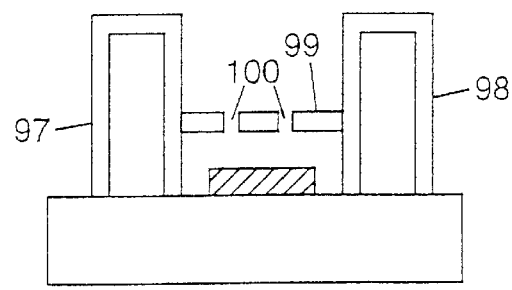

In the structure of FIG. 26, two sealed, spaced cavity structures 97 and 98, formed of a base sealed by a diaphragm, are mounted to the substrate 31 above a single second electrode 39 and have a bridge skirt section 99 between them forming the first electrode, which is suspended above the second electrode, and which may be perforated with openings 100. The structures 97 and 98 may be a single semi-annular cavity to ensure that the pressures in the two sides of the cavities are the same. As the walls of the sealed cavity structures 97 and 98 expand outwardly or contract inwardly with changes in pressure, the thin bridge skirt 99 between them will bulge upwardly or downwardly to change the effective capacitance with respect to the electrode 35.

Figure 27:
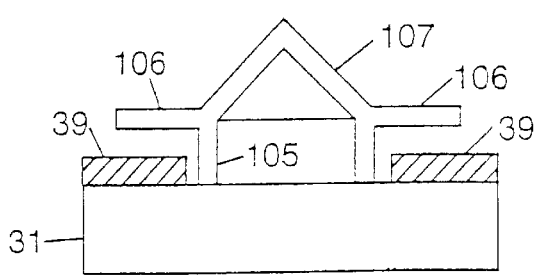

In the structure of FIG. 27, a cylindrical base 105 is bonded to the surface of the substrate 31 and has outwardly extending skirts 106. Instead of a flat diaphragm, the diaphragm is formed with a conical form 107. As the surfaces of the conical section 107 are pushed inwardly with increasing pressure, the skirt portions 106 forming the first electrode are rotated upwardly away from the second electrode 39 to change the capacitance, and vice versa with a decrease in external pressure.

Figure 28:
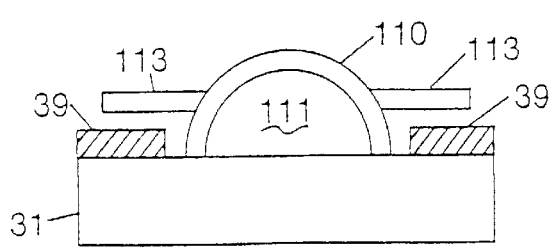

In the structure of FIG. 28, a hemispherical base 110 defining a continuous base and diaphragm structure is bonded to the substrate 31 to form a sealed cavity 111. A skirt 113 forming the first electrode extends out from the base 110 over the second electrode 39 in close proximity thereto. As the domed structure 110 deflects inwardly under increasing pressure, the skirt section 113 is rotated away from the electrode 39, and vice versa with a decrease in pressure.

It is understood that the invention is not confined to the particular construction and arrangement of parts set forth herein for illustration, but embraces such modified forms thereof as come within the scope of the following claims.

What is claimed is:

1. A method of forming a micromachined pressure sensor comprising:
    (a) lithographically masking a semiconductor substrate and etching away the semiconductor substrate forming a relatively thin walled base structure surrounding an open-ended cavity having a single open end;
    (b) masking regions of the semiconductor substrate which are not adjacent to, inside, or underneath the base structure forming masked regions of the semiconductor substrate, not masking regions of the semiconductor substrate which are adjacent to, inside, or underneath the base structure forming unmasked regions of the semiconductor substrate;
    (c) diffusing a dopant into the base structure and to a selected depth into the unmasked regions of the semiconductor substrate in a region around the base structure which extends outwardly therefrom forming doped portions of the semiconductor substrate in the unmasked regions of the semiconductor substrate and forming undoped portions of the semiconductor substrate in the masked regions of the semiconductor substrate;
    (d) bonding the base structure to a structural substrate to form a sealed cavity comprised of the structural substrate, the base structure and the doped portions of the semiconductor substrate; and
    (e) etching away the undoped portions of the semiconductor substrate to leave a diaphragm with an outwardly extending skirt that is comprised of the doped portions of the semiconductor substrate and that is integrally attached to the base structure.

2. The method of claim 1 further including before bonding the base structure to the structural substrate the steps of forming an electrode on the structural substrate in positions adjacent to the base structure which will be under the outwardly extending skirt.

3. The method of claim 1 wherein the structural substrate is formed of glass and the step of bonding the base structure to the structural substrate is carried out by anodically bonding.

4. The method of claim 1 wherein the doped portions of the semiconductor substrate are formed in a circular pattern to define a circular skirt which extends outwardly from the base structure.

5. The method of claim 1 wherein the semiconductor substrate is single crystal silicon.

6. The method of claim 5 wherein the dopant is boron.

* * * * *